US011224939B2

(12) United States Patent
Schnick et al.

(10) Patent No.: US 11,224,939 B2
(45) Date of Patent: Jan. 18, 2022

(54) APPARATUS FOR THERMAL PROCESSING (71) Applicant: KJELLBERG-STIFTUNG, Finsterwalde (DE)

(72) Inventors: Michael Schnick, Oberlungwitz (DE); Nils Brocke, Dresden (DE)

(73) Assignee: KJELLBERG-STIFTUNG, Finsterwalde (DE)

( * ) Notice: Subject to any disclaimer, the term of this patent is extended or adjusted under 35 U.S.C. 154(b) by 626 days.

(21) Appl. No.: 16/073,999

(22) PCT Filed: Jan. 27, 2017

(86) PCT No.: PCT/EP2017/051856
§ 371 (c)(1),
(2) Date: Jul. 30, 2018

(87) PCT Pub. No.: WO2017/129795
PCT Pub. Date: Aug. 3, 2017

(65) Prior Publication Data
US 2019/0039175 A1 Feb. 7, 2019

(30) Foreign Application Priority Data
Jan. 29, 2016 (DE) ...................... 10 2016 201 418.8

(51) Int. Cl.
*B23K 26/06* (2014.01)
*B23K 26/03* (2006.01)
(Continued)

(52) U.S. Cl.
CPC ........ *B23K 26/0626* (2013.01); *B23K 26/034* (2013.01); *B23K 26/0604* (2013.01);
(Continued)

(58) Field of Classification Search
CPC .................. B23K 26/0626; B23K 26/064; B23K 26/066; B23K 26/034; B23K 26/0604;
(Continued)

(56) References Cited

U.S. PATENT DOCUMENTS 4,275,288 A   6/1981   Makosch et al.
6,269,540 B1  8/2001   Islam et al.
(Continued)

FOREIGN PATENT DOCUMENTS

CN   1692005   11/2005
CN   1764513    4/2006
(Continued)

OTHER PUBLICATIONS

Chinese Office Action dated Dec. 13, 2019.
Japanese Office Action.

*Primary Examiner* — Phuong T Nguyen
(74) *Attorney, Agent, or Firm* — Jacobson Holman PLLC (57) ABSTRACT

An apparatus and a method for thermal processing within a processing region (1) at a workpiece surface (2) by means of a laser beam (6) emitted by at least one radiation source (5). Arranged in the beam path of the laser beam (6) between the at least one radiation source (5) and the processing region (1) on the workpiece surface (2), there is at least one element (10, 11, 12) by means of which the intensity of the laser beam (6) is modifiable in a locally defined manner within the processing region (1). As an alternative or in addition thereto, the intensity of at least one of the laser beams (6) is modifiable in a locally defined manner within the processing region (1) by a defined actuation of the plurality of radiation sources (5) such that a locally defined distribution of the intensity of the laser beam (6) striking the workpiece surface (2) is achievable within the processing region (1).

22 Claims, 8 Drawing Sheets (51) Int. Cl.
  *B23K 26/064* (2014.01)
  *B23K 26/073* (2006.01)
  *B23K 26/066* (2014.01)
(52) U.S. Cl.
  CPC .......... *B23K 26/064* (2015.10); *B23K 26/066* (2015.10); *B23K 26/0648* (2013.01); *B23K 26/0652* (2013.01); *B23K 26/0734* (2013.01)
(58) Field of Classification Search
  CPC ............ B23K 26/0648; B23K 26/0652; B23K 26/0734
  USPC .......................... 219/121.61, 121.73, 121.74
  See application file for complete search history.

(56) References Cited

U.S. PATENT DOCUMENTS

| | | | |
|---|---|---|---|
| 8,946,098 | B2 | 2/2015 | Wagner |
| 9,889,523 | B2 | 2/2018 | Gauch et al. |
| 2003/0150842 | A1 | 8/2003 | Mikame |
| 2007/0000877 | A1 | 1/2007 | Durr et al. |
| 2008/0170291 | A1 | 7/2008 | Nakamae et al. |
| 2015/0129565 | A1* | 5/2015 | Gauch .................. B23K 26/073 219/121.74 |
| 2015/0260985 | A1 | 9/2015 | Kitamura et al. |
| 2015/0273624 | A1* | 10/2015 | Yoshida .................. C03C 27/00 428/209 |

FOREIGN PATENT DOCUMENTS

| | | |
|---|---|---|
| CN | 102639281 | 8/2012 |
| CN | 104302438 | 1/2015 |
| CN | 104907691 | 9/2015 |
| DE | 4331262 A1 | 3/1995 |
| DE | 19944470 A1 | 4/2001 |
| DE | 10007391 A1 | 5/2001 |
| DE | 19960690 A1 | 7/2001 |
| DE | 10261422 A1 | 8/2004 |
| DE | 102004025873 A1 | 12/2005 |
| DE | 102007018400 A1 | 10/2008 |
| DE | 102009057566 A1 | 6/2011 |
| DE | 102012207220 A1 | 10/2013 |
| DE | 102014208435 A1 | 11/2015 |
| EP | 0005460 A1 | 11/1979 |
| EP | 1162023 A2 | 12/2001 |
| EP | 1415756 A1 | 5/2004 |
| FR | 2823688 A1 | 10/2002 |
| GB | 2453943 A | 4/2009 |
| JP | 2013-513487 | 4/2013 |
| JP | 2015-174100 | 10/2015 |

* cited by examiner

APPARATUS FOR THERMAL PROCESSING

BACKGROUND OF THE INVENTION

The present invention relates to an apparatus and a method for thermal processing within a processing region at a workpiece surface by means of a laser beam emitted by at least one radiation source.

Laser radiation is often used for processing workpieces, for example for welding, cutting or coating. Here the energy introduced by the laser radiation brings about the sought-after change in the material. However, a disadvantage in many methods is that the laser radiation is only adjustable coarsely and to an insufficient extent from the outside in terms of its intensity, in particular in terms of the local intensity distribution. Usually, the intensity distribution follows a Gaussian distribution in the focal spot in this case.

SUMMARY OF THE INVENTION

The present invention is therefore based on the object of developing an apparatus and a method, by means of which there can be a defined local influence on the intensity of laser radiation during thermal processing of workpieces.

According to the invention, this object is achieved by an apparatus according to the claims.

An apparatus for thermal processing within a processing region at a workpiece surface by means of a laser beam emitted by at least one radiation source has at least one element in the beam path of the laser beam, said element being arranged between the at least one radiation source and the processing region on the workpiece surface. The intensity of the laser beam within the processing region is modifiable in a locally defined manner within the processing region by means of this at least one element. As an alternative or in addition thereto, the intensity of at least one of the laser beams is modifiable in a locally defined manner within the processing region by way of a defined actuation of the plurality of radiation sources. Consequently, a locally defined distribution of the intensity of the laser beam striking the workpiece surface is achievable within the processing region.

The obtained locally defined distribution of the intensity on the workpiece surface also influences a temperature distribution on the workpiece surface or in the volume of the workpiece, and the desired surface processing is consequently controllable in a more targeted manner. By virtue of the intensity of one or more laser beams in the beam path being modified to this end or an appropriate adaptation of the intensity that is achievable on the workpiece surface already being carried out by an actuation of the radiation sources, this can be carried out both efficiently and with little outlay in terms of apparatus. Consequently, in principle, one or, preferably, two or more than two laser beams can be influenced from the outside or from externally in terms of their intensity such that the desired intensity can influence the workpiece surface in the desired spatial distribution. Here, in particular, the processing region should be understood to mean the region on which the laser radiation strikes and which is processed, preferably at the same time, by at least two laser beams. Here, the distribution of the intensity can be both inhomogeneous and homogeneous in the processing region or it can be designed to be symmetric or asymmetric.

Provision can be made for the laser beams emitted by the plurality of radiation sources to be directed onto the processing region as individual laser beams such that the locally defined distribution of the intensity for forming a desired processing profile is only achieved on the processing region. Typically, it is consequently also possible to obtain, in the processing region, at least two, preferably at least three, particularly preferably at least six focal spots by way of a corresponding number of radiation sources or a corresponding division of at least one single laser beam emitted by one single radiation source, the spatial distribution thereof reflecting the locally defined distribution of the intensity of the laser radiation.

Preferably, the plurality of radiation sources and/or the laser beams are arranged in a ring-shaped manner in order to obtain a radiation field on the processing region that is as uniform as possible. Here, a ring-shaped arrangement should be understood to mean, in particular, any arrangement in which the centers of the radiation sources and/or the laser beams are connected by a closed line that is free from kinks. Consequently, an ellipsoidal arrangement, in particular a circular arrangement thus may be present.

Particularly preferably, the plurality of radiation sources and/or the laser beams are arranged in at least two rings in order to further increase flexibility. The rings are typically arranged concentrically, i.e., have a common center. An even or an odd number of radiation sources or laser beams can be arranged on each of the rings. Provision can be made for the radiation sources to be arranged unevenly about a mean propagation axis, in particular with a pairwise different angle offset such that back reflections into one of the radiation sources are avoided.

A plurality of laser beams can be directed to the processing region through a common optical unit, i.e., beam-guiding and/or beam-shaping optical elements; however, at least one of the laser beams can also have a dedicated optical unit that deviates from the further laser beams. Preferably, each of the radiation sources is provided with a beam-guiding and/or beam-shaping optical element, said optical elements being adjustable independently of one another such that each of the laser beams is able to be influenced in terms of its properties by the respective optical element in a manner that is independent of the other laser beams.

Typically, a plurality of radiation sources are actuatable simultaneously and independently of one another by way of the targeted actuation in such a way that the intensity of the respectively emitted laser beam can be modified. This facilitates a multiplicity of processing options by actuating individual radiation sources. This actuation of the plurality of radiation sources can also be modified over time such that, over time, different intensity distributions can be obtained within the processing region. Thus, an increased intensity at the front in the direction of the advance movement can be modified in such a way for example that, at a subsequent time, an increased intensity can be obtained next to the direction of the advance axis or at the back in the direction of the advance movement. It is also possible to realize a circular or elliptical movement of a region of elevated intensity within the processing region.

At least one of the laser beams can be directed onto or into the processing region with a focal length that deviates from that of the further laser beams in order to obtain additional adjustment options for the intensity distribution on the workpiece surface.

Moreover, the focal length of one of the laser beams is able to be influenced using a refractive or diffractive optical element in order to be able to undertake setting of the focal length in a simple manner. By way of example, this can be a lens or a glass carrier, on which microstructures form an optical grating. Preferably, the focal length of each of the laser beams is able to be influenced by a refractive or diffractive optical element that is assigned to the radiation source emitting the respective laser beam.

As an alternative or in addition thereto, at least one of the laser beams can be directed into the processing region with a power that differs from that of the remaining laser beams. Consequently, the intensity distribution on the workpiece surface can already be influenced by setting the power at the laser radiation source.

Provision can also be made for at least one of the laser beams to have a beam cross section that differs from that of the remaining laser beams in order to assist the formation of the locally defined intensity distribution, in particular in the case of a superposition of the focal spots within the processing region.

Typically, this is achieved by virtue of a diffractive or refractive optical element that is arranged at an angle deviating from 90° in relation to the optical axis (expressed differently, it stands obliquely in the beam path) and/or a stop influencing the shape, in particular the beam cross section, of at least one of the laser beams. In particular, a diffractive optical element (DOE) can be used to this end, said diffractive optical element being arranged at any angle, preferably 90°, in relation to the optical axis in the beam path.

Provision can be made for an electromechanical actuation element, preferably a motor or actuator, which moves the at least one diffractive or refractive optical element. Preferably, this movement is a rotational movement, i.e., a rotation, an inclination or a tilt. As an alternative or in addition thereto, however, at least one linear movement can be performable by the electromechanical actuating element such that the at least one diffractive or refractive optical element can be movable in three translational degrees of freedom and three rotational degrees of freedom. As an alternative or in addition thereto, the electromechanical actuating element also can move the radiation source itself relative to the diffractive or refractive optical element.

The locally defined distribution of the intensity of the laser beam striking the workpiece surface or of the striking laser beams typically is a ring-shaped intensity distribution. The latter is preferably achieved by a ring-shaped arrangement of the laser beams in relation to a mean propagation direction of the individual laser beams between the radiation source and the processing region.

An output of the light-guiding fiber should also be understood to be a radiation source since a laser beam is emitted here.

Provision can be made for at least one radiation source to be provided with a light-guiding fiber; however, typically a plurality of radiation sources are each provided with light-guiding fibers, i.e., a light guiding fiber is assigned to each of the radiation sources or the light-guiding fiber is arranged at this radiation source. Preferably, at least two of the light-guiding fibers are combined to form a fiber bundle in which the light-guiding fibers particularly preferably lie so close together that a collimation optical unit can be used for the fiber bundle. The design is simplified by a single collimation optical unit, which can be designed as a common collimation optical unit for all fibers, for example. Moreover, the use of the light-guiding fibers facilitates more flexible guidance of the radiation. Finally, a power of the laser radiation applied to the processing region can simply be increased as a result of this by virtue of additional radiation sources, such as additional laser modules, for example, being added to the fiber bundle or the emitted additional laser beams likewise being guided through the collimation optical unit. Likewise, it is also possible to provide only one radiation source or individual radiation sources with a light-guiding fiber and operate the further radiation sources without light-guiding fibers.

If use is made of the light-guiding fibers, the radiation source themselves, in particular, can have any orientation provided the light-guiding fibers are arranged in such a way that a ring-shaped intensity distribution is achieved on the workpiece surface, for example by way of a ring-shaped arrangement of outputs of the light-guiding fibers or a corresponding influence being exerted on the laser radiation by optical elements.

A plurality of radiation sources can be actuatable independently of one another by regulable or controllable electric resistors, connected upstream or in parallel, that are assigned to the respective radiation sources, or the radiation sources can be operated individually with predetermined electric currents or voltages. Moreover, a respective radiation source can be operable individually by a controllable or regulable current source and can be individually actuatable. It is also possible to actuate the plurality of radiation sources independently of one another by electrical or electronic bypass circuits that are assigned to the respective radiation sources. By way of this, it is possible to set the intensities of the individual emitted laser beams in a quick and targeted manner. Should a plurality of radiation sources be combined to form emitter groups, these emitter groups, too, can be adjustable by an adjustable electric resistor and an electric current resulting therefrom.

Typically, an odd number of radiation sources and/or laser beams is present provided a plurality of radiation sources or laser beams are used since this can avoid a direct back-reflection into one of the radiation sources or damage to the radiation source. As an alternative or in addition thereto, an asymmetric arrangement of the radiation sources and/or of the laser beams may also be provided.

Provision can be made for a plurality of radiation sources to be used, said radiation sources each emitting or being able to emit a laser beam. Here, at least one of the laser beams typically has a polarization that differs from that of the remaining laser beams. In a particularly preferred way, the polarization of the laser beams is different in a pairwise manner in each case.

As an alternative or in addition thereto, radiation sources that lie opposite one another can emit laser beams with different wavelengths when a plurality of radiation sources are used in order to reduce the risk of mutual damage and facilitate different types of processing.

At least one of the radiation sources can have a wavelength filter which is only transmissive for the wavelength of the laser beam emitted by the respective radiation source; i.e., it is reflective to other wavelengths, in particular. This can prevent an ingress of stray radiation from other radiation sources.

Typically, at least one of the radiation sources has an optical diode in order to avoid damage by entering scattered radiation or back-reflections. In the case of linearly polarized radiation, the optical diode is typically constructed from a polarization filter and a circular polarizer, i.e., a $\lambda/4$ plate. Instead of the polarization filter (or in addition thereto), use, however, can also be made of a polarizing beam splitter, for example a polarizing beam splitter cube.

In the case of circularly polarized radiation, the optical diode preferably has a polarization filter and/or a polarizing beam splitter for splitting the circularly polarized radiation into their linearly polarized constituents and/or a Faraday rotator and a polarization filter and/or a polarizing beam splitter for unifying the linearly polarized individual beams.

The wavelength filter and/or the optical diode can be inclined or tilted in relation to a propagation direction of the respective radiation source provided with the wavelength filter in order to avoid a back-reflection into the radiation source. As an alternative or in addition to the wavelength filter and the optical diode, use can also be made of a polarization filter for protecting the radiation source.

Provision can be made for a device for supplying additional material onto or into the processing region to be present and for the at least one emitted laser beam to be directed onto or into the processing region in such a way that a free region that is not irradiated by the laser beam or the laser beams is present within the processing region, a shadow-free supply being facilitated by means of said free region. Preferably, the additional material is supplied directly into the free region. As a result, there can be simultaneous processing of the workpiece by means of laser radiation that is adjustable in terms of its intensity and by means of additional material.

Advantageously, the plurality of radiation sources and/or the laser beams are arranged in a ring-shaped manner around the device for supplying additional material such that a uniform impingement of the additional material by means of laser radiation is possible. Preferably, the radiation sources and/or the laser beams are arranged in at least two rings which, particularly preferably, are concentric. Provision can be made for the additional material to be guided through the center point of these concentric rings.

If use is made of a plurality of radiation sources, these can be arranged in such a way that the laser beams emitted by the radiation sources cross in a single region of intersection or point of intersection. Preferably, the additional material is also guided through this region of intersection such that the additional material is only heated in the region of intersection, which may lie in the processing region, for example, while there is no heating in regions above and below this region of intersection.

For the purposes of forming a ring-shaped radiation field of the laser beam, at least one axicon or any other optical element that converts a punctiform beam into a ring-shaped beam can be arranged in the beam path of at least one laser beam. Here, the optical element can be a special conically ground lens or a prism, a conical lens or a hollow cone, or it can be provided with toric surfaces. Moreover, the optical element can be constructed as a diffractive element, a refractive element or as a hybrid structure made of the diffractive element and the refractive element. For the purposes of shaping the beam geometry and adapting the intensity distribution, the described optical element or the axicon can be combined with further axicons, collimation lenses, focusing lenses or other optical elements. Preferably, the device for supplying the additional material is here arranged in the free region of the ring-shaped radiation field that is not irradiated by the laser beam.

The element for locally influencing the intensity of the laser beam can be a polarizer, a polarizer pair with in each case a different polarization axis, a color filter, a stop, a radiation trap or a shutter. Naturally, combinations of the aforementioned components may also be arranged in the beam path of one or more of the laser beams.

The radiation source is typically a diode laser, a fiber laser, a solid-state laser, an excimer laser, a $CO_2$-based laser or any other gas-based laser type. If use is made of a plurality of radiation sources, different laser types may also be used in combination with one another. The at least one radiation source preferably can be operated in continuous wave operation, in quasi continuous wave operation or in pulsed operation. Preferably, the radiation source is embodied as a diode laser since this laser type has a compact structure at the desired power, wherein, particularly preferably, the radiation source is present as a diode laser stack, diode laser bar or single emitter laser.

Preferably, the radiation source is a diode laser radiation source which radiates without a fiber coupling directly onto the workpiece surface in order to obtain an intensity that is as high as possible on the workpiece surface.

This directly radiating diode laser radiation source can be constructed in such a way that a plurality of individual radiation sources are arranged in a ring-shaped manner about the optical axis such that a free space arises along the optical axis. This free space can be used for supplying the additional material or a gas. As an alternative or in addition thereto, an apparatus for observing the process can also be arranged in the free space during the surface processing in the processing region.

Provision can be made for the laser beam or, particularly in the above-described laser radiation source, the laser beams to be focused by a focusing lens or at least one mirror onto the processing region. To this end, the mirror can be partly transmissive; moreover, a plurality of partly transmissive mirrors can also be arranged in succession in order to obtain the desired intensity distribution.

The individual radiation sources and/or the radiation beams are typically arranged in at least two sectors around the optical axis, wherein the structure of the arrangement may repeat with a regular or irregular angle ratio.

Moreover, these sectors can be arranged in such a way that a slow diode laser propagation direction (also referred to as "slow axis") differs between at least two of the sectors, preferably between all of the sectors. Particularly preferably, the diode laser radiation source is present here in the form of a laser rod (also referred to as "laser stack"). Typically, the slow diode laser propagation directions of individual diode laser radiation sources forming the laser rod are aligned in such a way that they extend parallel to the slow diode laser propagation direction of the entire laser rod. The laser rod itself should have less than ten individual diode laser radiation sources.

Moreover, provision can be made for the laser beams emitted by the individual radiation sources in the various sectors to be superposed by means of wavelength multiplexing, polarization multiplexing or beam superposition (spatial multiplexing).

Preferably, the radiation source or the radiation sources and/or the at least one element are arranged within a housing. The housing can be formed from metal; however, use can also be made of a plastics housing. Typically, all components required for emitting or influencing the laser beam or the laser beams are arranged within the housing.

In a method according to the invention for thermal processing within a processing region at a workpiece surface, a laser beam emitted by at least one radiation source is modified in terms of its intensity in a locally defined manner within the processing region by way of an element arranged between the at least one radiation source and the processing region on the workpiece surface. As an alternative or in addition thereto, a plurality of radiation sources are actuated in such a defined manner that the intensity of at least one of the laser beams is modifiable in a locally defined manner within the processing region such that a locally defined distribution of the intensity of the laser beam striking the workpiece surface is achieved within the processing region.

Provision can be made for the laser beams emitted by a plurality of radiation sources to be directed onto or into the processing region as individual laser beams and for at least one of the laser beams to have a focal length that deviates from that of the further laser beams, said focal length being set by a refractive or diffractive optical element that is arranged in the beam path of this laser beam and that is displaceable along the beam path. As a result of the displaceability, an adaptation of the focal length and consequently also of the power density in the processing region can be achieved in a simple and quick manner.

As an alternative or in addition thereto, at least one of the laser beams can be embodied with a beam cross section that differs in terms of its shape from that of the remaining laser beams by way of a diffractive or refractive optical element that is arranged at an angle deviating from 90° in relation to the optical axis and/or a stop. Here, the diffractive or refractive optical element can also be rotated about an axis of rotation that is perpendicular to the optical axis in order consequently to modify the beam cross section of the laser beam in terms of its shape.

Advantageously, at least one of the laser beams emitted by the radiation sources can be varied in terms of its power in order to be able to achieve different intensities within the processing region. Preferably, a plurality of the laser beams are varied in terms of their respective power or deactivated either in succession or at the same time.

A temperature of the processing region can be monitored by a temperature measurement system, which preferably comprises an optical infrared sensor, a pyrometric sensor and/or a thermographic sensor and/or is embodied as an imaging thermographic system. Typically, the intensity of the laser beam or of the laser beams is regulated by a control unit on the basis of the measured values of the temperature measurement system. As a result of this, a desired temperature profile is achieved on the processing region at all times.

The described method can be carried out by means of the apparatus already described above; thus, the apparatus is configured to carry out the method.

The described method and the described apparatus can be used for additive manufacturing, cutting, welding, soldering, curing, surface structuring, modifying material properties and/or coating.

DESCRIPTION OF THE DRAWINGS

Exemplary embodiments of the invention are illustrated in the drawings and will be described below on the basis of FIGS. 1 to 29.

In the figures.

DETAILED DESCRIPTION OF THE INVENTION

Figure 1:
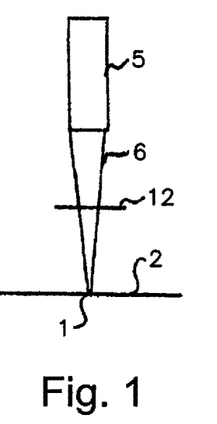
FIG. 1 shows a lateral schematic view of an apparatus for thermal processing.

FIG. 1 shows, in a schematic lateral view, a radiation source 5, which emits a laser beam 6 onto a processing region 1, which lies on a workpiece surface 2. In the illustrated example embodiment, the laser beam 6 is already focused onto the workpiece surface 2 when leaving the radiation source 5; i.e., it does not require any further optical elements arranged in the beam path outside of the radiation source 5. For the purposes of setting an intensity of the laser beam 6, an optical filter 12 that is adjustable in terms of its filter effect is situated in the beam path of said laser beam as an intensity-reducing element. However, in further exemplary embodiments, a polarizer, a polarizer pair with in each case a different polarization axis, a stop, a beam trap which typically partly shadows the laser beam 6, or a preferably rotating shutter may be arranged instead of the optical filter 12 or in addition thereto. The shown apparatus can be used for separating, welding or changing material properties by means of laser radiation.

Figure 2:
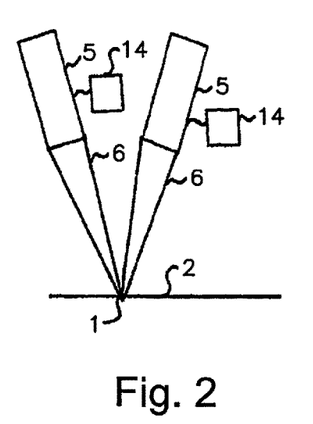
FIG. 2 shows a view corresponding to FIG. 1 with a plurality of radiation sources that are actuatable independently of one another.

In a lateral view corresponding to FIG. 1, FIG. 2 illustrates a structure in which two radiation sources 5 are used, said radiation sources each emitting a single laser beam 6. Recurring features are provided with identical reference signs in this figure, and also in the following figures. The laser beams 6 strike the workpiece surface 2 in the processing region 1 under different angles as individual laser beams 6. However, they are both aligned in such a way that the focus in each case lies on the workpiece surface 2. That is to say, the two laser beams 6 meet or are superposed on one another only at the focus. The two radiation sources 5 are each actuatable in a separate manner and independently of one another, in each case by a control unit 14. However, only a single control unit 14 can be used for separate actuation of the radiation sources 5. In the illustrated example embodiment, this is carried out by way of modifiable electrical resistors, which allow electric currents or voltages of different magnitudes for the radiation sources 5 and which are likewise actuated or regulated by the control unit 14. There is also a change in the output power of the respective laser beam 6 corresponding to the supplied electric current or voltage. A locally defined intensity distribution, which is also accompanied by correspondingly similar temperature distribution and which can consequently be set to the requirements of the respectively desired material processing, can be achieved in the processing region 1 by way of the superposition of the laser beams 6 on the workpiece surface 2. This allows an advantageous temperature distribution to be obtained in relation to the advance axis direction.

If a plurality of radiation sources 5 are used and actuated separately, one of the radiation sources 5 can in each case emit a laser beam 6 with the greatest possible power or can even emit no laser beam at any given time. This can be achieved by a current bypass, by a corresponding resistor setting or by controlled electric current sources.

In a view corresponding to FIG. 2, FIG. 3 once again shows a combination of a plurality of radiation sources 5, in which an element 13 for setting the focal length is arranged at least in the beam path of one of the radiation sources 5. In the illustrated example embodiment, this element 13 is a biconvex lens. However, any other diffractive or refractive optical element can be used. Moreover, one of the laser beams 6 is no longer focused onto the workpiece surface 2 at this time; instead, the focal plane is arranged in the workpiece volume. In further exemplary embodiments, the focal plane of at least one of the laser beams 6 may, however, also be arranged above the workpiece surface 2 or below a workpiece.

Figure 3:
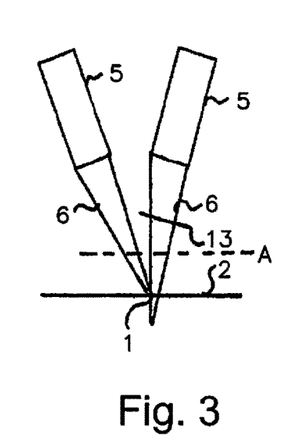
FIG. 3 shows a view corresponding to FIG. 2 with an element for setting the focal length in a beam path.
Figure 4:
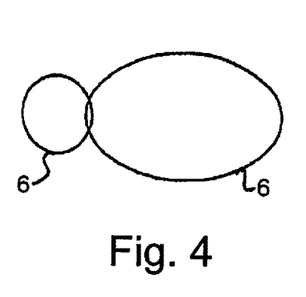
FIG. 4 shows two laser beams with beam cross sections of different shapes.

FIG. 4 shows the beam cross section of two laser beams 6 in a sectional plane above the workpiece surface 2, for example in the sectional plane A plotted in FIG. 3. The two laser beams 6 are focused onto the workpiece surface 2 and only superposed on one another in the processing region 1. One shape of the beam cross sections of the laser beams 6 is different in order to obtain an intensity distribution on the workpiece surface 2 within the processing region 1, said intensity distribution being spatially elongated in this case. While one of the beam cross sections is round, a further one is elliptical. However, other geometric shapes may also be used in further exemplary embodiments.

Figure 5:
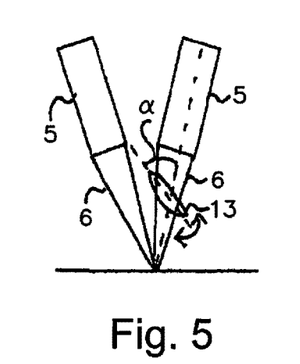
FIG. 5 shows a view corresponding to FIG. 3 with an optical element for influencing the beam cross section.

As illustrated in FIG. 5, the shape of the beam cross section of at least one of the laser beams 6 can be influenced by an optical element 13, said optical element being arranged in the beam path at an angle α which has an angle that differs from 90° in relation to the optical axis of the radiation source 5. To this end, the optical element 13 is rotatable in the beam path about an axis of rotation that is aligned perpendicular in relation to the optical axis such that different beam cross sections can be set. The rotation, inclination or tilt of the optical element 13 can be brought about, for example, by means of the control unit 14 and an electromechanical actuating element such as a motor or an actuator, preferably a piezo-actuator.

Figure 6:
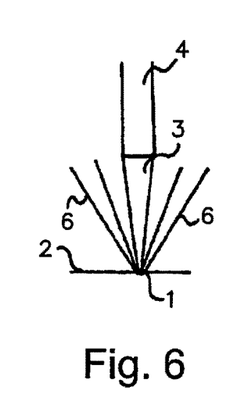
FIG. 6 shows a view, corresponding to FIG. 1, of the apparatus with an additional apparatus for supplying additional material.

The exemplary embodiment shown in FIG. 6 represents an apparatus for thermal processing, in which the laser beams 6 do not strike the workpiece surface 2 at right angles; however, a device 4 for supplying additional material 3 in or on the processing region 1 is provided between the beam paths of the laser beams 6. The additional material 3 and the laser beams 6 only coincide in the processing region 1 and they are guided thereto in a separated manner. Typically, the radiation sources 5 are arranged in a ring-shaped manner around the device 4 for supplying additional material 3. However, an arrangement of the radiation sources 5 in a plurality of concentric rings can also be provided, in which the device 4 for supplying additional material 3 lies in the center of the concentric rings. In further exemplary embodiments, use can also be made of the ring-shaped arrangement without the device 4 for supplying additional material 3.

In the shown example embodiment, the radiation sources 5 all have an adjustable laser output power of at most 200 W; however, in further exemplary embodiments, it is also possible to use a different maximum laser output power or radiation sources 5 with a set laser output power, i.e., without the option of an adjustment. It is likewise possible for at least one of the employed radiation sources 5 to have a laser output power that differs from that of the further radiation sources 5. Different radiation sources 5 can emit laser beams 6 of different wavelengths; i.e., at least one of the radiation sources 5 emits a wavelength that differs from that of the further radiation sources 5. Moreover, the individual radiation sources 5 can be different types of lasers, such as diode lasers, solid-state lasers, excimer lasers, gas lasers, fiber lasers or other laser types.

In the illustrated example embodiment, the additional material 3 is applied in perpendicular fashion onto the workpiece surface 2 or the processing region 1, while the laser beams 6 each strike the processing region 1 at an angle that differs from 90°. The additional material 3 is typically present in powder form in this case; however, use can also be made of suspensions with a liquid or a wire or band.

Figure 7:
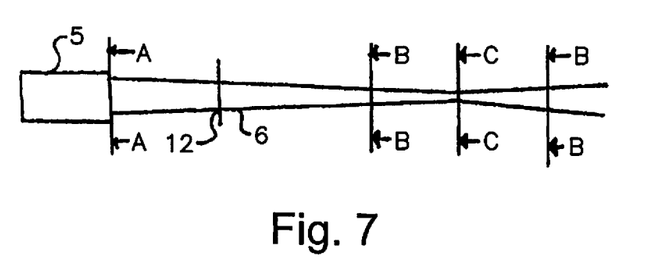
FIG. 7 shows a lateral view of the laser radiation source and of the emitted laser beam.

FIG. 7 shows a lateral view of radiation sources 5 that are arranged next to one another, and the emitted laser beams 6. At least one of the laser beams 6 emanating from the radiation source 5 is guided through a shutter 12, which is alternately opened and closed. In further exemplary embodiments, a stop or beam trap can also be used instead of the shutter 12.

Figure 8:
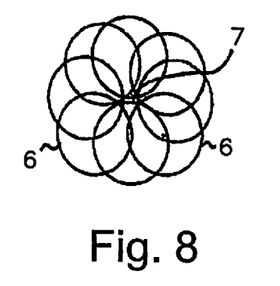
FIG. 8 shows a view corresponding to FIG. 4 of a plurality of laser beams emitted by radiation sources arranged in a ring-shaped manner.

FIG. 8 shows a section along the sectional plane A in FIG. 7. The laser beams 6 overlap one another in part and have a ring-shaped arrangement. In further exemplary embodiments, the additional material 3 can also be supplied in a region 7 that is not touched by laser radiation, situated centrally within the laser beams 6. The number of laser beams 6 and the number of radiation sources 5 can be both even and odd, with a damage of individual radiation sources 5 on account of back reflections being less probable in the case of an odd number.

Figure 9:
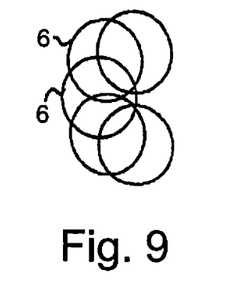
FIG. 9 shows a view corresponding to FIG. 8 with individual masked laser beams.
Figure 10:
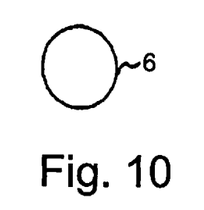
FIG. 10 shows a view corresponding to FIG. 9 of the superposed laser beams in the focal plane.

A section, corresponding to FIG. 8, along the sectional plane B in FIG. 7 is shown in FIG. 9. Here, some of the laser beams 6 are masked by the shutter or shutters 12. There is only a superposition of all laser beams 6 in the sectional plane C of FIG. 7, i.e. the focal plane, as shown in FIG. 10. By virtue of individual laser beams 6 being masked, a defined locally adapted intensity distribution of the laser radiation is achieved in the focal plane and in the processing region 1. In further exemplary embodiments, it is also possible to obtain a homogenous, symmetric and/or asymmetric intensity distribution of the laser radiation.

Figure 11:
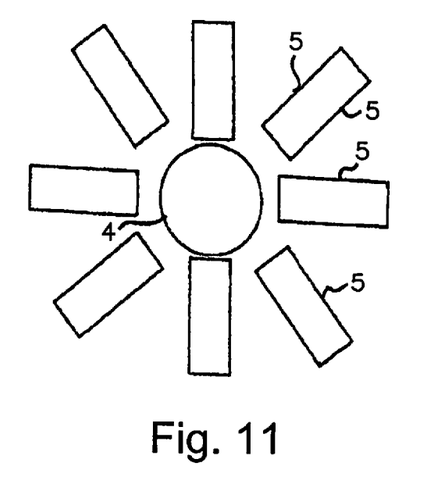
FIG. 11 shows a schematic structure of the laser radiation sources arranged in a ring-shaped manner.

FIG. 11 shows, in a plan view, the radiation sources 5 that are arranged in a circular or ring-shaped manner, in the center of which the device 4 for supplying additional material 3 is arranged. In the illustrated exemplary embodiment, the radiation sources 5 are diode lasers; however, they can also be solid-state lasers or lasers of another type. It is likewise possible for only some of the radiation sources 5 to be embodied as diode lasers, while the remaining radiation sources 5 are lasers of another type, for example solid-state lasers. In principle, arbitrary combinations of lasers of different types are possible.

The diode lasers shown in FIG. 11 and serving as the radiation sources 5 radiate directly onto the workpiece surface 2 without a fiber coupling. Instead of the device 4 for supplying additional material 3, or in addition thereto, a camera or another imaging apparatus for observing the carried-out process may also be arranged centrally between the radiation sources 5.

In the exemplary embodiment shown in FIG. 11, the radiation sources 5 are arranged in a ring-shaped manner in sectors, wherein a direction of a slow axis, i.e. a slow diode laser propagation direction, in a first of the sectors differs from the direction of the slow axis in a second one of the sectors. Moreover, the laser beams emitted by the individual radiation sources in the various sectors may be superimposed on one another by means of wavelength multiplexing, polarization multiplexing or beam superposition.

In further exemplary embodiments, the radiation sources 5 may also be present as laser rods.

Figure 12:
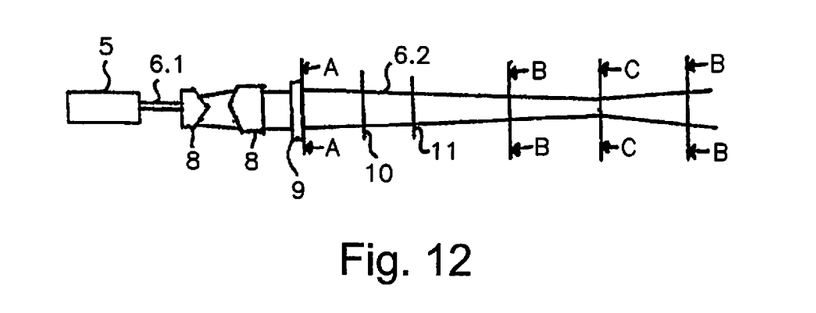
FIG. 12 shows a view corresponding to FIG. 7 with two axicons.
Figure 13:
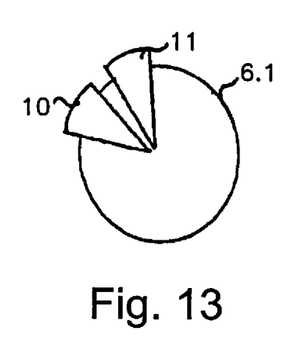
FIG. 13 shows a view, corresponding to FIG. 8, of the laser beam with two stops.

FIG. 12 shows a lateral view, corresponding to FIG. 7, of a further exemplary embodiment of a beam path of the laser radiation. The radiation source 5 now emits a single laser beam 6.1, which strikes a first axicon 8 and which is transformed into a ring-shaped laser beam 6.2 with a radiation-free region 7 in the interior area thereof. The laser beam 6.2 is modified in terms of the shape and the area of the beam across section by a second axicon 8 and stop 9 arranged downstream thereof. Here, the stop 9 can also have a rotatable configuration. Like in the section along the sectional plane A of FIG. 12, illustrated in FIG. 13, the spatial distribution of the laser radiation in the beam path can be influenced further by further stops 10 and 11.

Figure 14:
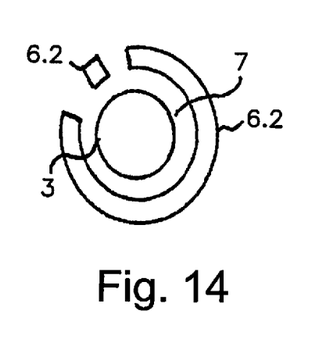
FIG. 14 shows an illustration corresponding to FIG. 9 of the radiation field obtained by the arrangement shown in FIG. 13.

It is also possible to form a ring-shaped laser beam 6 and mask individual regions thereof by the stops 10 and 11. Then, as shown in FIG. 14, the additional material 3 can be guided centrally in the ring-shaped laser beam 6.2.

Figure 15:
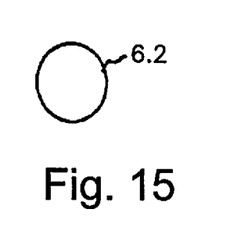
FIG. 15 shows an illustration corresponding to FIG. 10 of the laser beam shown in FIG. 14 in the focal plane.

FIG. 15 shows, in turn, that the laser beam 6.2 influenced by the axicon 8 only merges in the focal plane and subsequently widens again.

Figure 16:
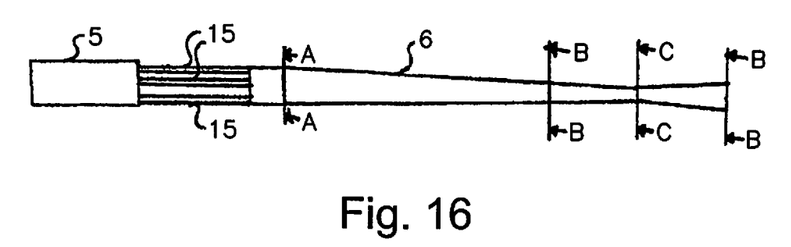
FIG. 16 shows a view corresponding to FIG. 7 with a plurality of fibers.

FIG. 16 shows a further exemplary embodiment, in which the laser radiation is guided through a plurality of fibers 15. The fibers 15 have a ring-shaped arrangement and the region 7 into which no laser radiation reaches is situated centrally between the fibers.

Figure 17:
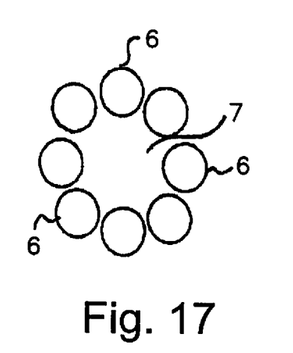
FIG. 17 shows a view corresponding to FIG. 8 of laser beams extending in a ring-shaped manner.
Figure 18:
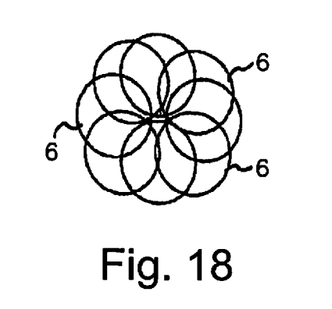
FIG. 18 shows a view corresponding to FIG. 17 with partly overlapping laser beams.

A cross section along the sectional plane A in FIG. 16 can be seen accordingly in FIG. 17. Here, the laser beams 6 are not superposed. FIG. 18 shows how the laser beams 6 overlap one another in the case of a further approach to the focal plane. The pattern of the beam cross sections shown in this figure is obtained in the sectional plane B of FIG. 16.

Figure 19:
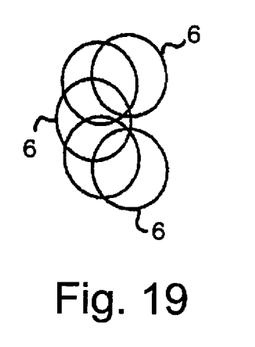
FIG. 19 shows a view corresponding to FIG. 18 with partly masked laser beams.
Figure 20:
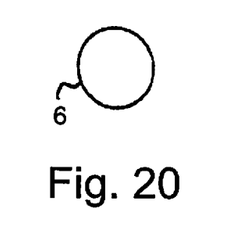
FIG. 20 shows a view corresponding to FIG. 10 of laser beams superposed in the focal plane.

In further exemplary embodiments, and also in the exemplary embodiments shown in FIG. 16, individual fibers can be completely blocked by stops or other beam-blocking or annihilating elements such that the pattern of the beam cross sections shown in FIG. 19 arises. FIG. 20 shows, once again, that the laser beams 6 are completely superposed on one another merely in the focal plane that corresponds to the sectional plane C in FIG. 16.

Figure 21:
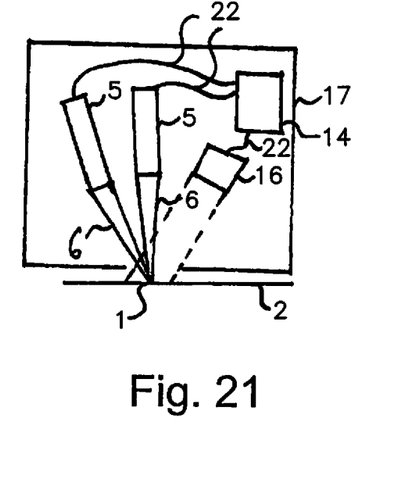
FIG. 21 shows a schematic lateral illustration, corresponding to FIG. 1, of the apparatus with a housing and temperature measurement system.

FIG. 21 shows, in a schematic lateral view, an exemplary embodiment of the invention in which two laser radiation sources 5 are arranged in a housing 17 above the processing region 1, together with the control unit 14 and a temperature measurement system 16. The housing 17 has an aperture through which the laser beams 6 strike the processing region 1. The temperature measurement system 16 monitors the processing region 1 in respect of a temperature distribution. To this end, the temperature measurement system 16 is embodied as an infrared sensor measuring in two dimensions, which transmits its measured values to the control unit 14 via a cable 22.

The radiation sources 5 are controlled or regulated in terms of their intensity by the computing unit 14 via further cables 22, and so the demanded temperature profile is always present in the processing region. In further embodiments, further components or assemblies, which are required for operating the radiation sources 5 or for influencing the optical properties of the laser beams 6, may be arranged in the housing 17. Moreover, it is possible that the control unit 14 also actuates individual optical elements 10, 11, 12 or lenses 13, which are arranged in the beam path of the laser beams 6, in order to influence the intensity of the laser beams 6 in the processing region 1.

Figure 22:
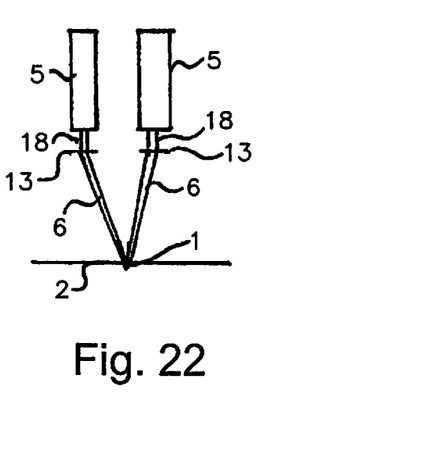
FIG. 22 shows a schematic lateral illustration, corresponding to FIG. 1, in which each of the radiation sources has a single lens in the beam path of the emitted laser radiation.
Figure 24:
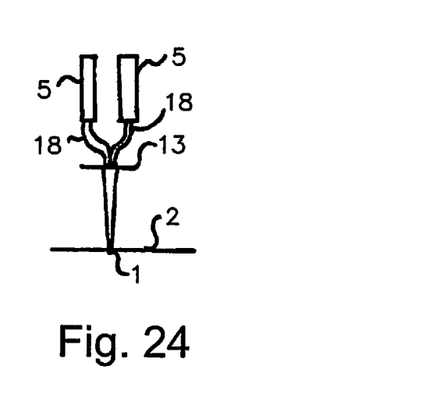
FIG. 24 shows a schematic illustration of a fiber bundle with a common collimation optical unit.

FIG. 22 shows an exemplary embodiment in which an element 13 in the form of a convex lens is arranged in the beam path of each of the laser beams 6. In this exemplary embodiment, an optical fiber 18 is disposed downstream of each radiation source 5, the emitted laser radiation reaching the optical element 13 via said optical fiber and being focused onto the processing region 1 from there. Here, each of the optical elements 13 are individually adjustable, i.e., in particular, adjustable independently of other optical elements; by way of example, they are displaceable along three translation axes and/or rotatable about three axes of rotation. Even if FIG. 22 only illustrates a single optical element 13, this optical element 13 may have a plurality of components, for example a combination of at least one collimator and at least one focusing lens for manipulating and shaping the laser spot such that any shape of the laser spot, such as a line or an ellipse, in particular a circle, is adjustable. This facilitates maximum flexibility with minimum aberrations. Likewise, the optical elements 13 of the individual radiation sources 5 may have an identical construction or differ at least one time in a pairwise manner. As illustrated in FIG. 24, at least two of the optical fibers 18 may also be combined as light-guiding transportation fibers to form a fiber bundle which has a common collimation lens 13 as a collimation optical unit. To this end, the optical fibers typically lie directly against one another; i.e., they have direct touching contact. Alternatively, a distance may be provided between the optical fibers 18, said distance at most corresponding to the fiber diameter of one of the optical fibers 18. Here, an arrangement of the fibers can be designed in such a way that six further optical fibers 18 are grouped around a central optical fiber 18. Alternatively, the space of the central optical fiber 18 may also remain free.

As a result of using fiber bundles, the laser power applied to the processing region 1 can easily be scaled. By way of example, if six laser modules are provided as radiation sources 5, the emitted laser radiation of which is guided through a fiber bundle, the power can be scaled by installing six further laser modules and a further fiber bundle.

Figure 23:
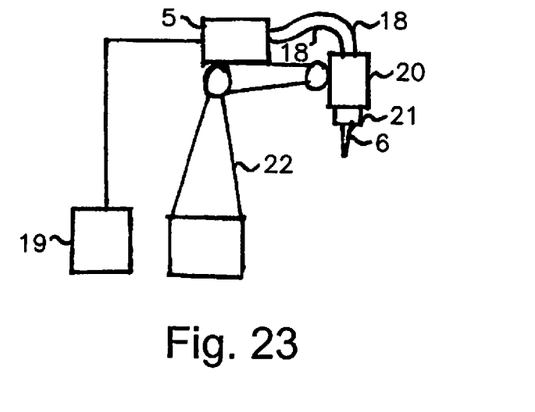
FIG. 23 shows a schematic illustration of an industrial robot with a laser head.

An industrial robot 22, i.e. a robot whose carrying arm has six degrees of freedom, is illustrated in FIG. 23. A power source 18 provides power for the radiation source 5 which emits the laser radiation and which is applied to the carrying arm. The emitted laser radiation is guided to the laser head 20 by a bundle of optical fibers 18. An interchangeable head 21 is attached to the laser head 20 by means of a bayonet closure. The interchangeable head 21 contains optical components for setting the focal length or the intensity of the laser radiation or, more generally, a beam-shaping optical unit, and it can be interchanged when necessary, and so a flexible system arises. By using the optical fibers 18, it is possible to achieve both a spatially adjacent and spatially separated arrangement of the radiation source 5 and of the beam-shaping optical unit within or outside of the housing 17.

The arrangement of the optical fibers 18 in fiber bundles allows an increase in power and, at the same time, an adaptation of a focal spot diameter or focus diameter. Power electronics for adaptive actuation of individual radiation sources 5 can be arranged both in the current source 19 and in the laser head 20.

Figure 25:
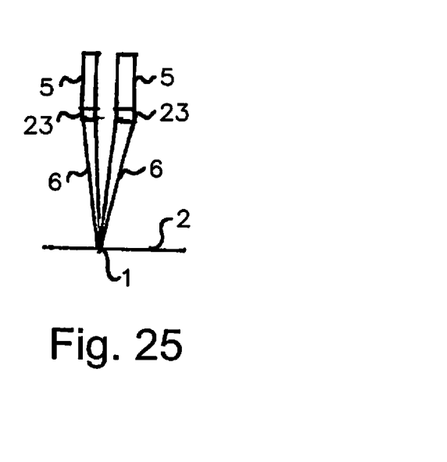
FIG. 25 shows a schematic illustration of radiation sources with different wavelengths.

FIG. 25 once again shows, in a schematic lateral view, an exemplary embodiment in which the radiation sources 5 emit laser beams 6 with different wavelengths. The illustrated radiation sources 5 are arranged opposite one another and are each provided with a wavelength filter 23 which only transmits for the wavelength of the laser radiation emitted by the respective radiation source 5 and which, however, reflects or absorbs further wavelengths for the purposes of a protection against back reflections from the workpiece surface 2. The illustrated wavelength filters are therefore different in terms of their properties since, typically, each of these wavelength filters is sensitive to a different wavelength.

Figure 26:
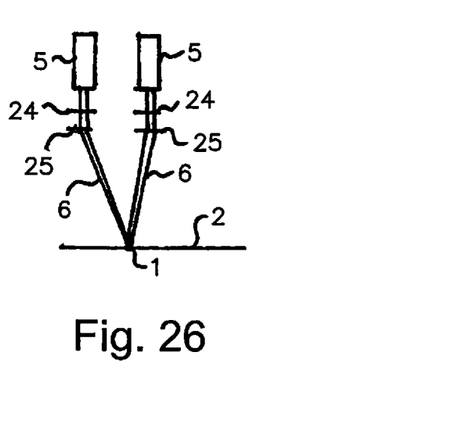
FIG. 26 shows a schematic illustration of radiation sources which emit laser radiation with different polarizations.

In an exemplary embodiment depicted in FIG. 26, the radiation sources 5 each emit linearly polarized laser radiation 6 or unpolarized laser radiation, which passes through a polarizer before striking the workpiece surface 2. In order to avoid back-reflections, an optical diode made of a polarization filter 24 and a circular polarizer 25 is provided between each of the radiation sources 25 and the workpiece surface 2. The optical diodes can each have an identical construction; however, at least one of the optical diodes can also have a different construction from that of the further optical diodes.

If use is made of circularly polarized laser radiation 6, the optical diode typically has the polarization filter 24 for splitting the circularly polarized laser radiation 6 into its linearly polarized constituents and a Faraday rotator and a polarization filter 24 for unifying the linearly polarized constituents.

Figure 27:
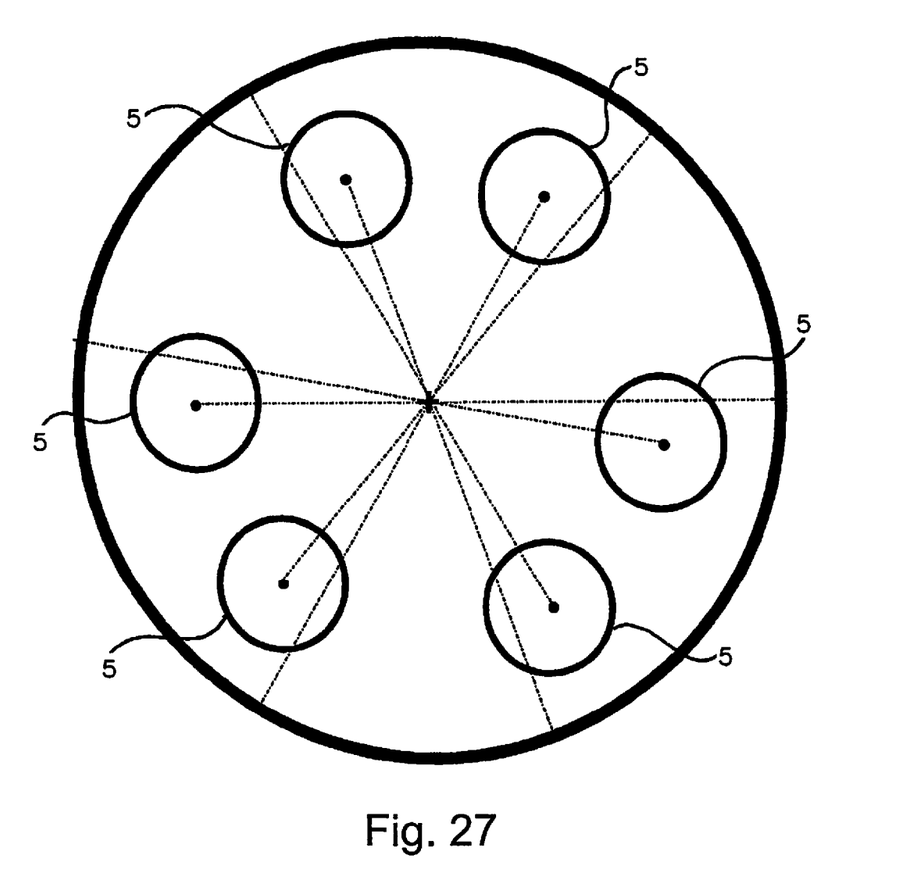
FIG. 27 shows a plan view of an arrangement of radiation sources and/or laser beams, which have an uneven distribution.

FIG. 27 shows a plan view of an arrangement of a plurality of radiation sources 5, for example laser modules or outputs of the optical fibers 18, or a plurality of laser beams 6, which are arranged in irregular fashion on a circle. The radiation sources 5 or laser beams 6 are arranged on a circle, a single circle, but they do not have a uniform spacing on the diameter of the circle; instead, they are each arranged with an angle offset such that none of the radiation sources 5 or none of the laser beams 6 lie exactly opposite another radiation source 5 or another laser beam 6.

Figure 28:
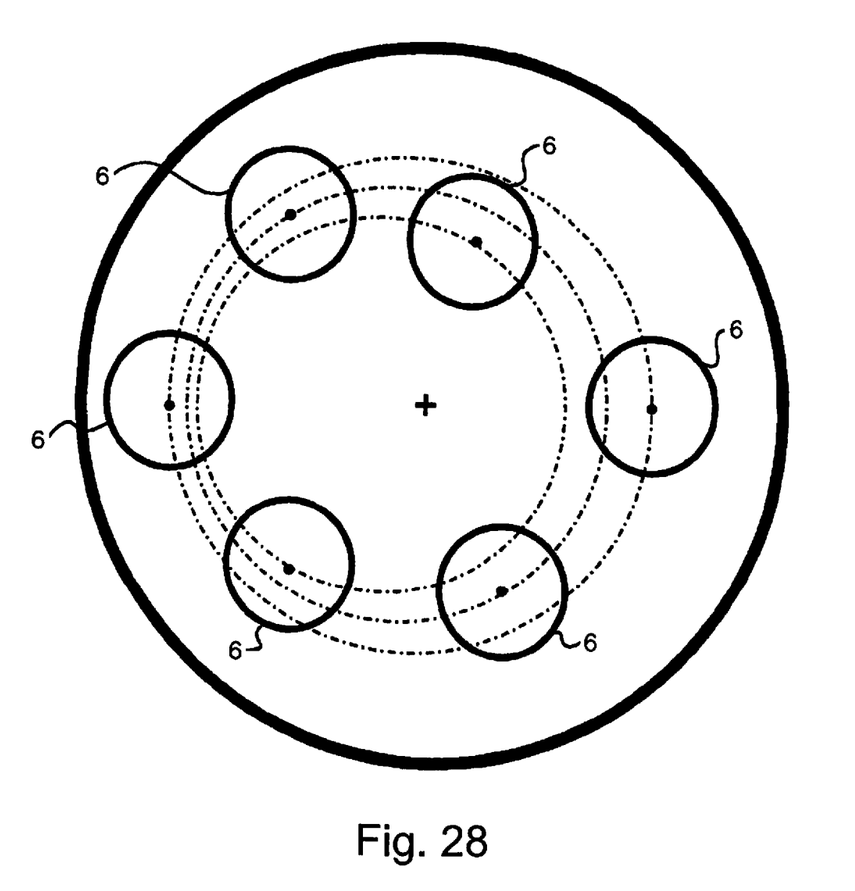
FIG. 28 shows a view corresponding to FIG. 27 of radiation sources or laser beams which are arranged in a plurality of non-concentric circles.

In FIG. 28, an arrangement is reproduced in a view, corresponding to FIG. 27, of the plurality of radiation source 5 or laser beams 6, in which arrangement the radiation sources 5 or laser beams 6 are distributed on a total of three non-concentric circles. Respectively two of the radiation sources 5 or laser beams 6 are arranged on a circle in this case.

Figure 29:
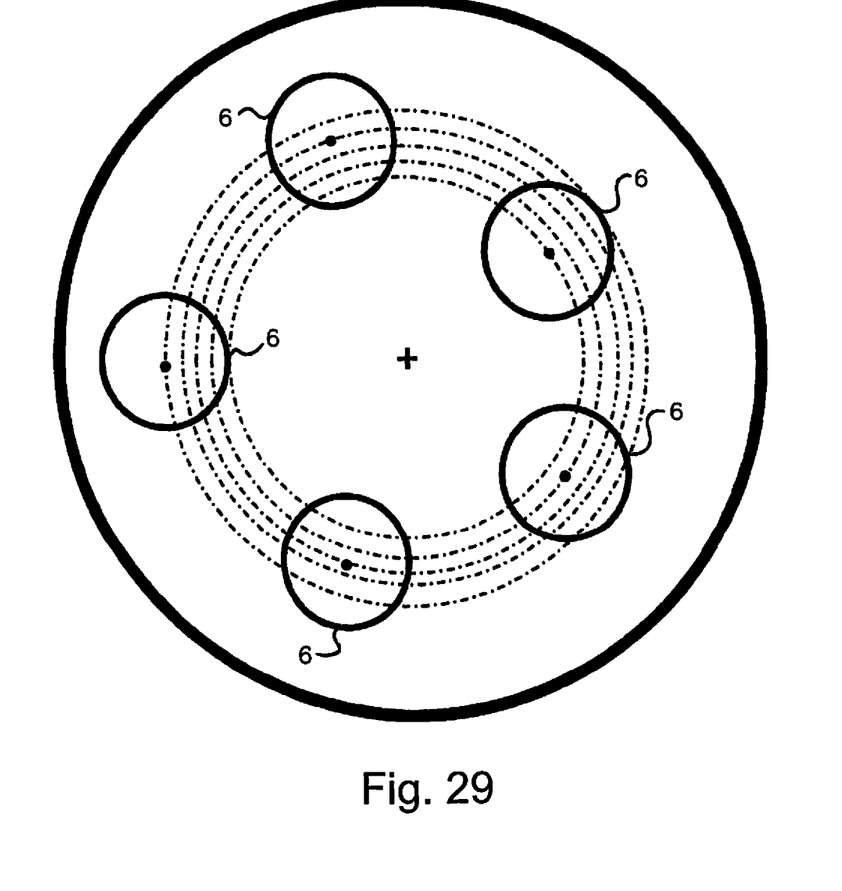
FIG. 29 shows a view corresponding to FIG. 27 of radiation sources or laser beams, which are each arranged in circles with different diameters.

A corresponding arrangement of five radiation sources 5 or laser beams 6, in which each radiation source 5 or each laser beam 6 is arranged on a circle with a different diameter in relation to the common center axis or the common center point, is illustrated in FIG. 29 in a view corresponding to that of FIG. 27. All features of the various embodiments disclosed in the exemplary embodiments can b combined with one another and can be claimed individually.

The invention claimed is:

1. An apparatus for thermal processing within a processing region at a workpiece surface, wherein the apparatus comprising at least one laser beam emitted by at least one radiation source, wherein
   the intensity of at least one of the laser beam is modifiable in a locally defined manner within the processing region by way of a defined actuation of a plurality of radiation sources such that
   a locally defined distribution of the intensity of the at least one laser beam striking the workpiece surface is achievable within the processing region, wherein the plurality of radiation sources is used and the radiation sources that lie opposite one another emit laser beams with different wavelengths or the plurality of the radiation sources or plurality of laser beams are present in an odd number or the plurality of the radiation sources is present in an asymmetric arrangement and a device for supplying additional material onto/into the processing region is present and the emitted laser beams are directed onto/into the processing region in such a way that a free region that is not irradiated by the laser beams is present within the processing region, wherein the additional material is supplied into the free region.

2. The apparatus as claimed in claim 1, wherein the laser beams emitted by the plurality of radiation sources (5) are directed onto the processing region as individual laser beams.

3. The apparatus as claimed in claim 2, wherein at least one of the laser beams is directed onto/into the processing region with a focal length that deviates from that of the further laser beams.

4. The apparatus as claimed in claim 3, wherein the focal length of one of the laser beams-(6) is able to be influenced using a refractive or diffractive optical element.

5. The apparatus as claimed in claim 4, wherein the focal length of each of the laser beams is able to be influenced by the refractive or diffractive optical element that is assigned to the radiation source emitting the respective laser beam.

6. The apparatus as claimed in claim 4, wherein the diffractive or refractive optical element is movable.

7. The apparatus as claimed in claim 2, wherein at least one of the laser beams is directed into the processing region with a power that differs from that of remaining laser beams.

8. The apparatus as claimed in claim 2, wherein at least one of the laser beams has a beam cross section that differs from that of remaining laser beams in terms of its shape.

9. The apparatus as claimed in claim 8, wherein the beam cross section is influenced in terms of its shape by a diffractive or refractive optical element that is arranged at an angle deviating from 90° in relation to an optical axis or by a stop.

10. The apparatus as claimed in claim 1, wherein the plurality of radiation sources or the laser beams are arranged in a ring-shaped manner.

11. The apparatus as claimed in claim 10, wherein the plurality of radiation sources or the laser beams are arranged in at least two rings, with the rings being concentric.

12. The apparatus as claimed in claim 1, wherein the plurality of radiation sources are each provided with light-guiding fibers and at least two of the light-guiding fibers are combined to form a fiber bundle, in which the light-guiding fibers lie so closely together that a collimation optical unit is used for the fiber bundle.

13. The apparatus as claimed in claim 1, wherein the plurality of the radiation sources are actuatable independently of one another by regulable electric resistors assigned to the respective radiation sources or by electric or electronic bypass circuits assigned to the respective radiation sources or the respective radiation source is in each case operable individually by a controllable or regulable electronic power source and individually deactivatable.

14. The apparatus as claimed in claim 1, wherein the plurality of radiation sources each emit a laser beam, wherein at least one of the laser beams has a polarization that differs from that of remaining laser beams.

15. The apparatus as claimed in claim 1, wherein at least one of the radiation sources has a wavelength filter which is only transmissive for a wavelength of the laser beam emitted by the respective radiation source.

16. The apparatus as claimed in claim 1, wherein at least one of the radiation sources has an optical diode.

17. The apparatus as claimed in claim 16, wherein the optical diode has a polarization filter or a polarizing beam splitter and a circular polarizer for polarized laser beams or a polarization filter or a polarizing beam splitter for splitting circularly polarized laser beams into their linearly polarized constituents and a Faraday rotator and a polarization filter or a polarizing beam splitter for unifying the linearly polarized constituents.

18. The apparatus as claimed in claim 1, wherein the plurality of radiation sources or the laser beams are arranged in a ring-shaped manner around the device for supplying additional material.

19. The apparatus as claimed in claim 1, wherein the plurality of radiation sources are provided, the laser beams of which cross in a region of intersection, wherein the additional material is guided through this region of intersection.

20. The apparatus as claimed in claim 1, wherein at least one axicon is arranged in a beam path of the at least one laser beam to form a ring-shaped radiation field, wherein, the device for supplying the additional material is arranged in the free region of the ring-shaped radiation field that is not irradiated by the laser beam.

21. The apparatus as claimed in claim 1, wherein the radiation source is a diode laser stack, a diode laser bar or a single emitter laser.

22. The apparatus as claimed in claim 1, wherein the radiation source or the plurality of radiation sources are arranged within a housing.

* * * * *